(12) United States Patent
Wang

(10) Patent No.: US 7,425,065 B2
(45) Date of Patent: Sep. 16, 2008

(54) EYEWEAR WITH RELEASABLE, ADJUSTABLE NOSEPIECE

(75) Inventor: Bao Lien Wang, Tainan (TW)

(73) Assignee: Protective Optics, Inc., Livermore, CA (US)

( * ) Notice: Subject to any disclaimer, the term of this patent is extended or adjusted under 35 U.S.C. 154(b) by 0 days.

(21) Appl. No.: 11/650,035

(22) Filed: Jan. 4, 2007

(65) Prior Publication Data

US 2008/0165319 A1    Jul. 10, 2008

(51) Int. Cl.
    *G02C 5/12*    (2006.01)
(52) U.S. Cl. .................. 351/137; 351/138; 351/139
(58) Field of Classification Search .......... 351/137, 351/138, 139, 80, 136, 78, 81, 82, 83, 86
See application file for complete search history.

(56) References Cited

U.S. PATENT DOCUMENTS

| 600,496 | A | | 3/1898 | Meyrowitz |
|---|---|---|---|---|
| 1,647,107 | A | | 10/1927 | Franchini |
| 1,853,872 | A | | 4/1932 | Meyrowitz |
| 1,910,460 | A | | 5/1933 | Boutelle |
| 1,923,566 | A | | 8/1933 | Baker |
| 1,942,393 | A | | 1/1934 | Baker |
| 2,027,037 | A | | 1/1936 | Gottieb |
| 2,157,247 | A | * | 5/1939 | Schumacher ............ 351/136 |
| 2,918,676 | A | | 12/1959 | Matheson |
| 3,610,743 | A | | 10/1971 | Lindblom |
| 4,820,035 | A | | 4/1989 | Kanda |
| D311,196 | S | | 10/1990 | Wiedmann |
| 5,098,180 | A | | 3/1992 | Tobey |
| 5,187,503 | A | | 2/1993 | Hilton |
| D339,596 | S | | 9/1993 | Kopfer |
| 5,371,554 | A | | 12/1994 | Aspesi |
| 5,386,254 | A | * | 1/1995 | Kahaney ............ 351/60 |
| 5,526,070 | A | | 6/1996 | Simioni |
| 5,576,775 | A | | 11/1996 | Bolle |
| 5,682,621 | A | | 11/1997 | Park |
| 5,687,428 | A | | 11/1997 | Yamamoto |
| D387,792 | S | | 12/1997 | Bondet |
| D388,454 | S | | 12/1997 | Freeman et al. |
| 5,711,035 | A | | 1/1998 | Haslbeck |
| D391,598 | S | | 3/1998 | Simioni |
| D392,992 | S | | 3/1998 | Freeman et al. |
| 5,784,143 | A | | 7/1998 | Chang |
| D397,132 | S | | 8/1998 | Yee |
| D402,681 | S | | 12/1998 | MacWilliamson |
| 5,868,104 | A | | 2/1999 | Ramirez |
| D408,841 | S | | 4/1999 | Conway |
| 5,894,606 | A | | 4/1999 | Chiang |
| D410,485 | S | | 6/1999 | Jannard et al. |
| D418,535 | S | | 1/2000 | Hartman |
| 6,062,688 | A | | 5/2000 | Vinas |

(Continued)

*Primary Examiner*—Hung X. Dang
(74) *Attorney, Agent, or Firm*—Charles R. Cypher; James R. Cypher

(57) ABSTRACT

Eyewear includes a lens with front and rear surfaces, a peripheral edge surface, and a recess. A nosebridge is secured to the lens and a nosepad is secured to the nosebridge. The nosebridge has first and second ends and a substantially inverted-U-shaped body. The nosepad also has first and second ends and a substantially inverted-U-shaped body. An outer member substantially encases a core member of the nosepad. The nosepad is adjustable and releasably attached to the nosebridge, which is in turn releasably attached to the lens.

14 Claims, 5 Drawing Sheets

U.S. PATENT DOCUMENTS

| | | |
|---|---|---|
| D431,587 S | 10/2000 | Yang |
| 6,139,144 A | 10/2000 | Hynansky |
| 6,183,081 B1 | 2/2001 | Ono et al. |
| D438,888 S | 3/2001 | Freeman |
| 6,315,408 B1 | 11/2001 | Huang |
| D456,441 S | 4/2002 | Jannard et al. |
| 6,494,573 B1 | 12/2002 | Huang |
| 6,513,171 B1 | 2/2003 | Soper |
| 6,513,926 B1 | 2/2003 | Kizu |
| D473,582 S | 4/2003 | Gardner |
| 6,557,995 B1 | 5/2003 | Edwards |
| 6,582,074 B1 | 6/2003 | Chen |
| 6,692,124 B2 | 2/2004 | Katz et al. |
| 6,799,847 B2 | 10/2004 | Caplan |
| 6,883,184 B2 | 4/2005 | Lee |
| 7,147,321 B2 | 12/2006 | Van Atta |
| D537,097 S | 2/2007 | Freeman |

\* cited by examiner

EYEWEAR WITH RELEASABLE, ADJUSTABLE NOSEPIECE

BACKGROUND OF THE INVENTION

This invention relates generally to eyewear, and, in particular, to eyewear having a releasable nosebridge and a releasable, adjustable nosepad.

Eyewear typically has a nosepiece that is formed as part of the frame or is secured directly to the lens. Eyewear that incorporates a wraparound lens, commonly referred to as a shield lens, is well known in the art. Eyewear with a wraparound lens is often used by individuals when they are engaged in athletic activities, such as biking, skiing, and running. A problem common with eyewear, such as eyewear with a shield lens, for example, is that the nosepad is not adjustable.

It is an object of the present invention to provide eyewear having an adjustable nosepiece that reduces or overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain embodiments.

SUMMARY OF THE INVENTION

The principles of the invention may be used to advantage to provide embodiments of eyewear having an adjustable nosepad that is replaceable.

An object of the present invention is to provide eyewear with a releasable nosebridge attached to a lens and a releasable, adjustable nosepad attached to the nosebridge, permitting each of the three parts to be interchangeable.

An object of the present invention is to provide a nosepad with an adjustable core member, permitting it to accommodate variations in the size of the wearer's nose.

An object of the present invention is to provide a nosepad with a soft outer member, permitting greater comfort for the wearer and a nosepad that resists slipping.

An object of the present invention is to provide a lens with a recess that permits the nosebridge to fit at least partially therein.

An object of the present invention is to provide a nosebridge with an upper groove that snaps over the lower edge surface of the lens, easing assembly of the eyewear and the interchange of the nosebridge or lens.

An object of the present invention is to provide a nosepad core member that is hand-bendable, permitting easy adjustment of the nosepad by the wearer.

An object of the present invention is to provide a nosepad with ends that are at acute angles to the ends of the nosebridge, holding the lens away from the wearer's face.

An object of the present invention is to provide a nosepad that is attached to the nosebridge by removable screws, permitting interchange of the nosepad.

Substantial advantage is achieved by providing eyewear with an adjustable nosepad. In particular, certain embodiments provide adjustability for the user, providing improved fit and comfort. Other advantages include an improved aesthetic appearance and the ability to replace the nosepiece with another nosepiece.

These and additional features and advantages disclosed here will be further understood from the following detailed disclosure of the invention.

DETAILED DESCRIPTION OF THE INVENTION

Figure 1:
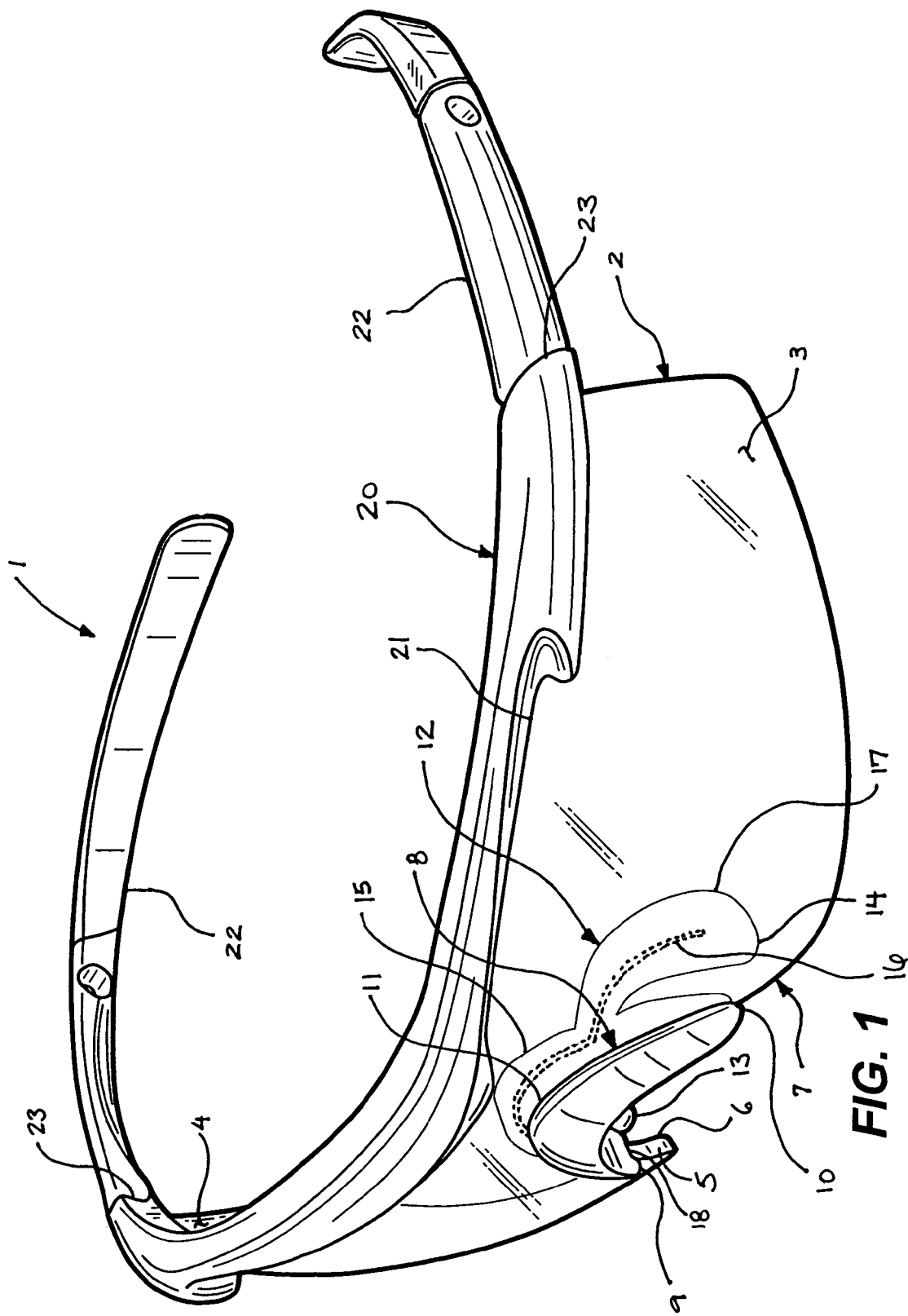
FIG. 1 is a perspective view of the eyewear of the present invention, looking down on the eyewear.
Figure 2:
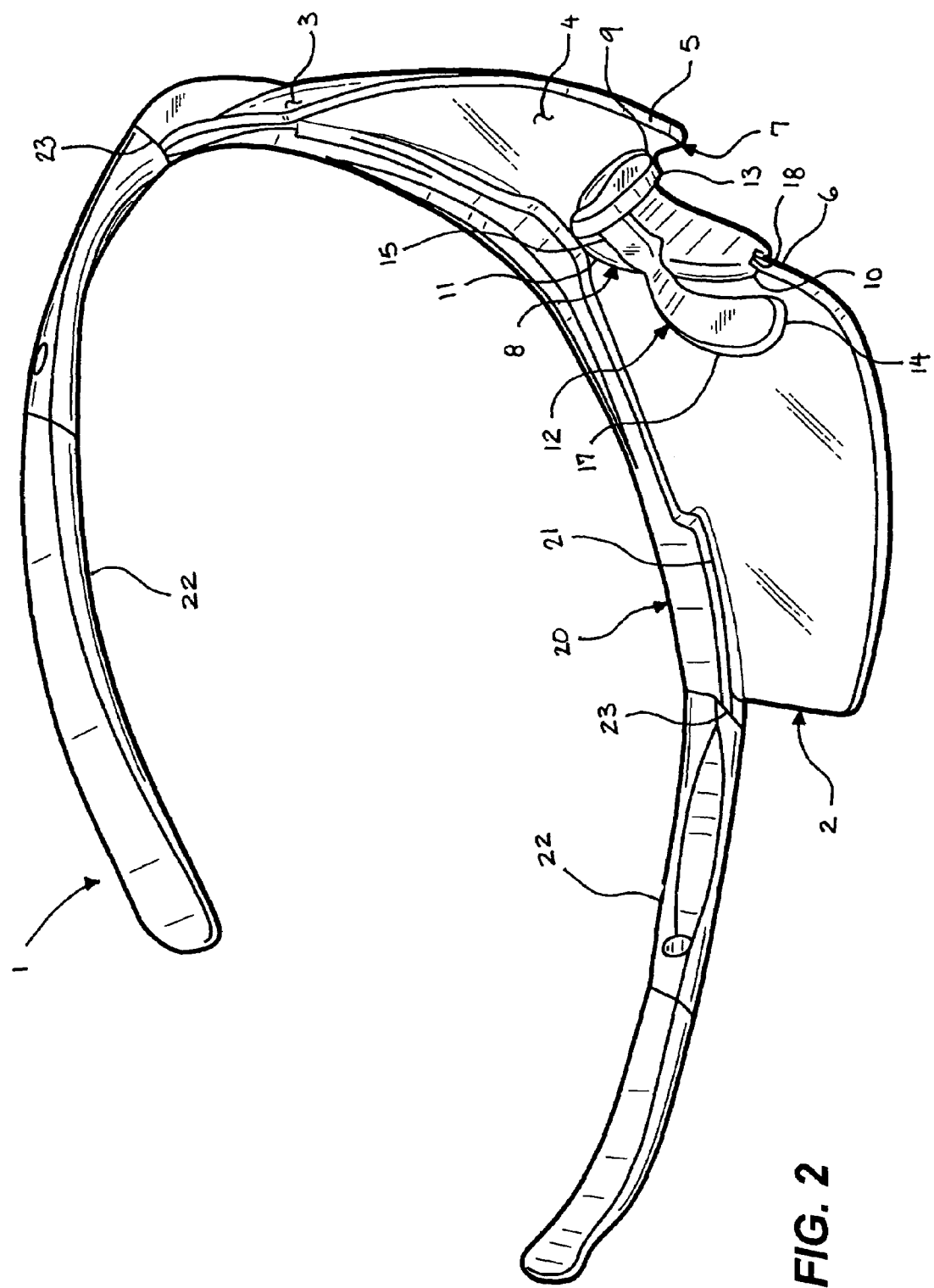
FIG. 2 is a perspective view of the eyewear of the present invention, looking up at the eyewear.
Figure 3:
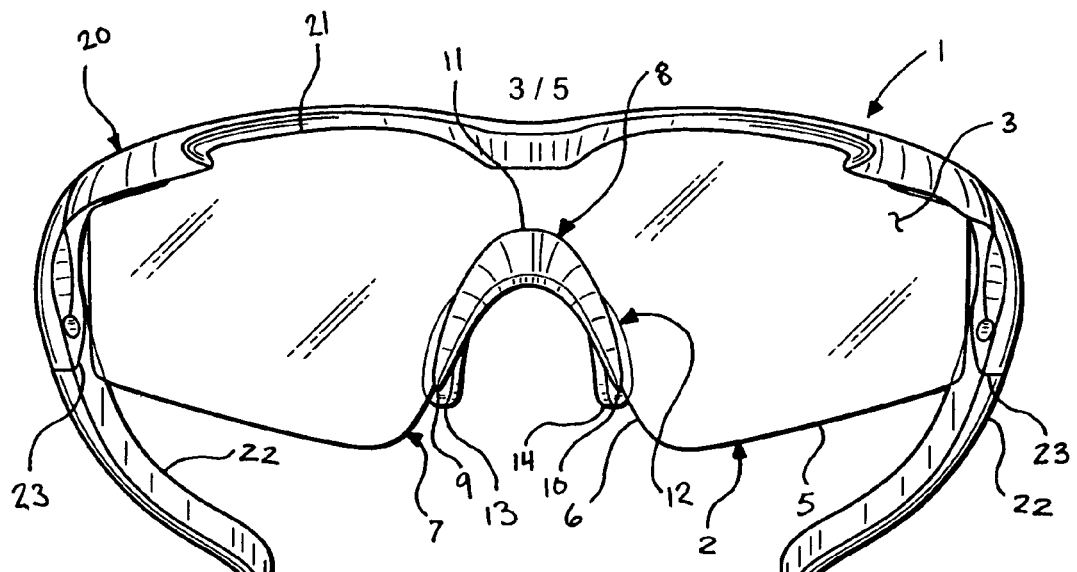
FIG. 3 is a front elevation view of the eyewear of the present invention.
Figure 4:
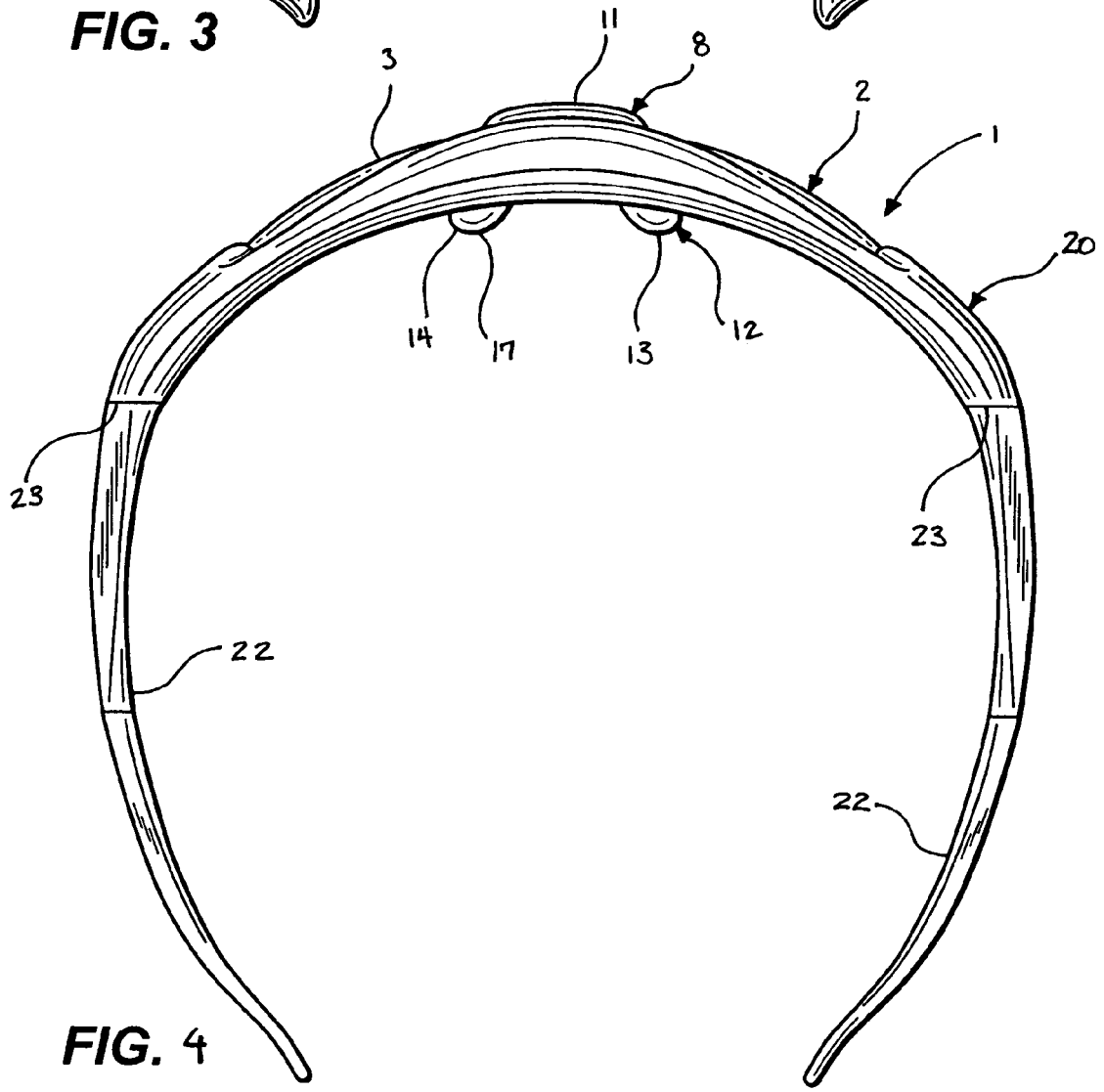
FIG. 4 is a top plan view of the eyewear of the present invention.
Figure 5:
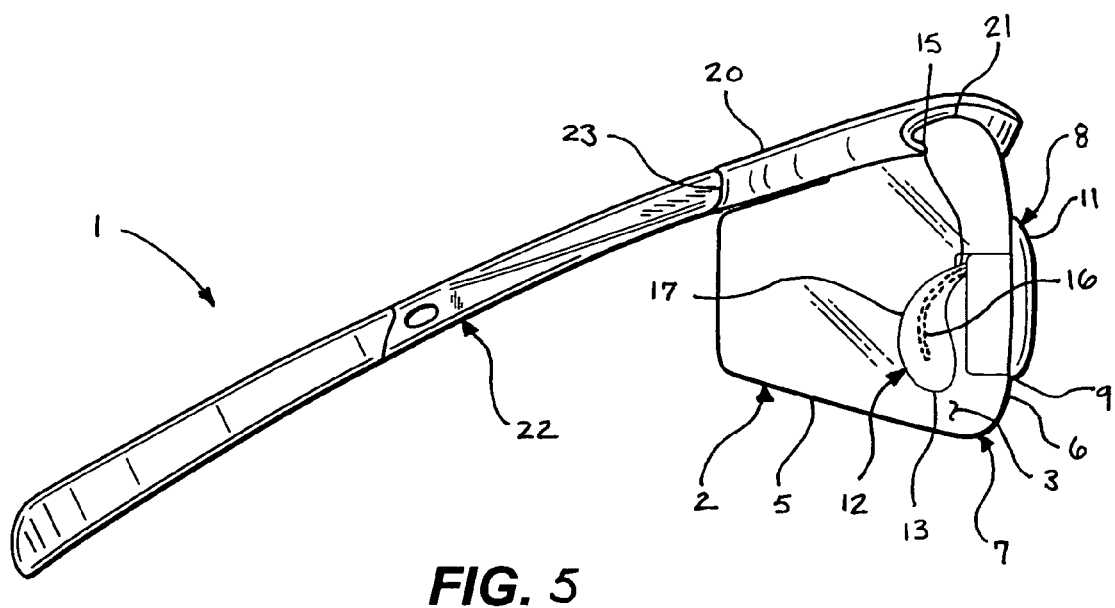
FIG. 5 is a side elevation view of the eyewear of the present invention.
Figure 6:
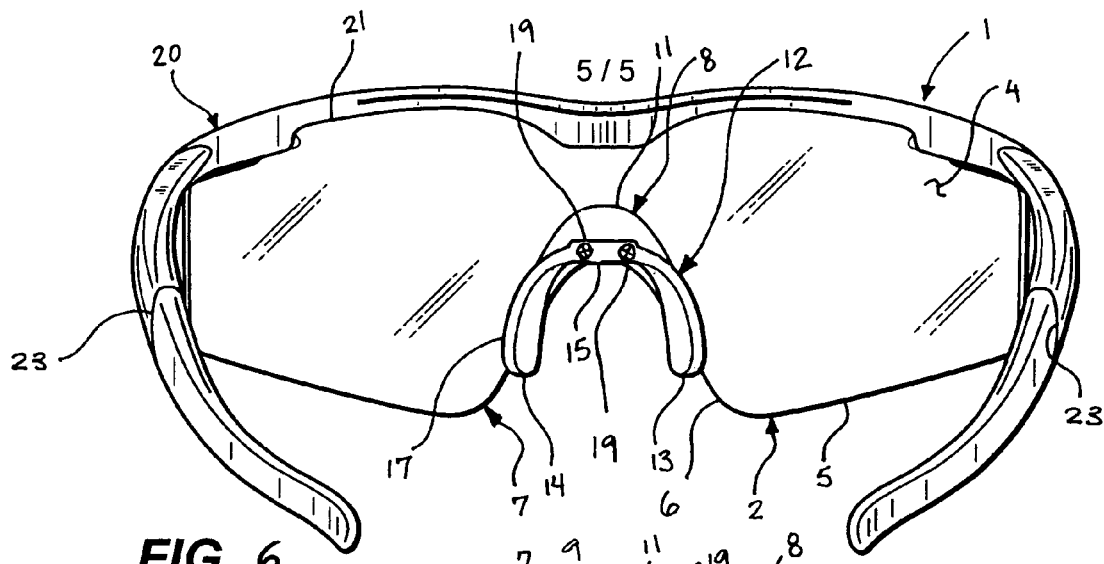
FIG. 6 is a back elevation view of the eyewear of the present invention.
Figure 7:
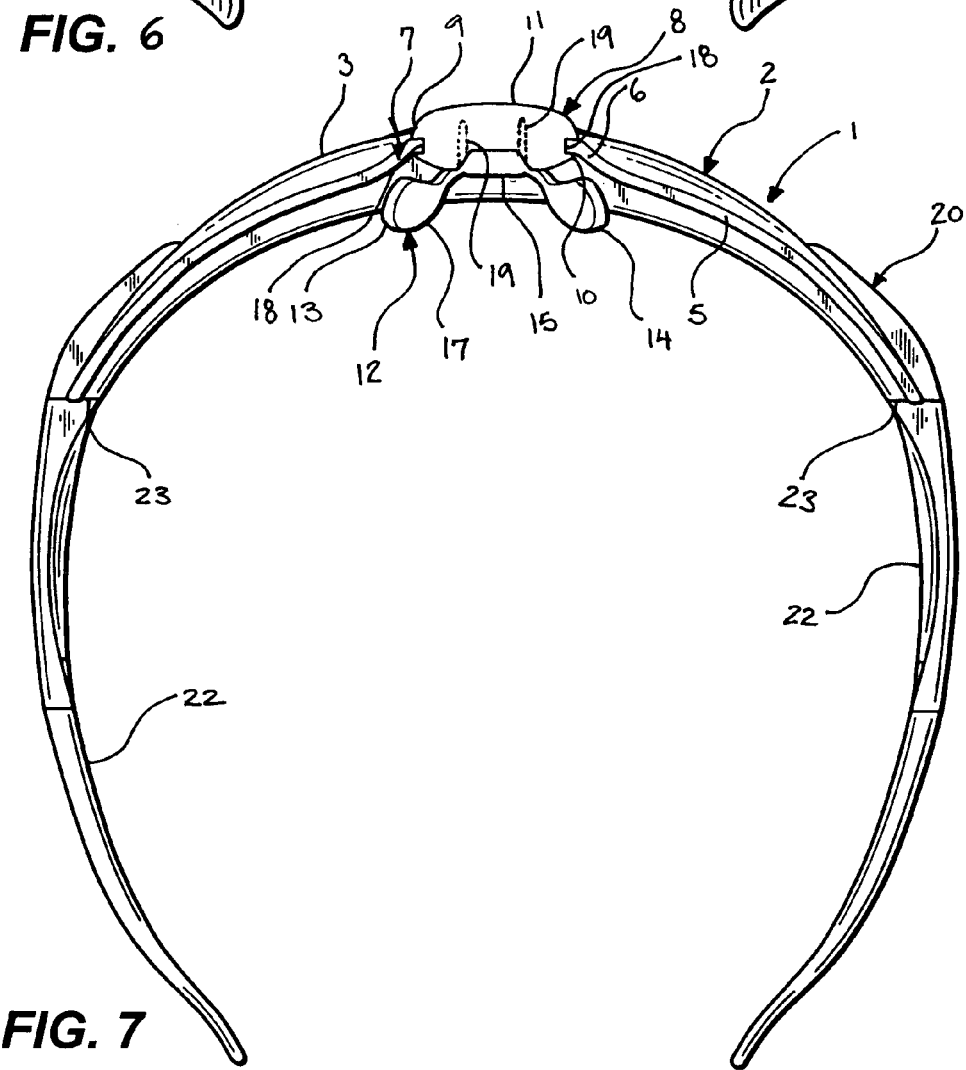
FIG. 7 is a bottom plan view of the eyewear of the present invention.

The present invention may be embodied in various forms. An embodiment of eyewear 1 is shown in FIGS. 1 through 7. In certain embodiments, eyewear 1 is sunglasses. In particular, the embodiment depicted here illustrates performance sunglasses, commonly referred to as shield eyewear, which include a single lens and are often used by bicycle riders and runners. However, it is to be appreciated that eyewear 1 is meant to include all types of glasses, including glasses having two separate lenses. Other eyewear suitable for use includes, for example, prescription glasses and safety glasses with clear lenses.

Certain directional terms used herein refer to directions with respect to the wearer of eyewear 1. Thus, the terms outward, outwardly, forward, and forwardly, as used herein, refer to a surface facing away from, or a direction extending away from, the face of a wearer of eyewear 1. The terms inward, inwardly, rear, and rearwardly refer to a surface facing toward, or a direction extending toward, the face of a wearer of eyewear 1.

The eyewear 1 of the present invention includes at least a lens 2, a nosebridge 8, and a nosepad 12. Preferably, the lens 2 has a front surface 3, a rear surface 4, and a peripheral edge surface 5. The nosebridge 8 preferably has a first end 9, a second end 10, and a substantially inverted-U-shaped body 11. Preferably, the nosebridge 8 is releasably secured to said lens 2. The adjustable nosepad 12 preferably has a first end 13, a second end 14, and a substantially inverted-U-shaped body 15. Preferably, the nosepad 12 is releasably secured to the nosebridge 8. The nosepad 12 preferably comprises a core member 16 and an outer member 17. Preferably, the outer member 17 substantially encases the core member 16. The outer member 17 is preferably softer than the core member 16 in order to improve the grip and comfort of the nosepad 12 on the user's nose.

Preferably, the eyewear 1 of the present invention also includes a frame 20, to which an upper edge 21 of the lens 2 is secured, and a pair of temple arms 22 at opposed ends 23 of the frame 20. The temple arms 22 may be secured to the frame 20, or to both the frame 20 and the lens 2. The temple arms 22 may pivot with respect to the lens 2 and the frame 20, or they may be fixed with respect to the lens 2 and the frame 20.

The temple arms 22 and the frame 20 may be formed of any suitable material, including, for example, plastic, or a rubber-coated core material, such as metal or plastic. In certain embodiments, the temple arms 22 and the frame 20 may be formed of a flexible, resilient material, such as beta titanium. In other embodiments, the temple arms 22 and frame 20 may be formed of a rigid material, such as a fiber-reinforced material, for example a carbon-fiber composite. Other suitable materials for the temple arms 22 and frame 20 will become readily apparent to those skilled in the art, given the benefit of this disclosure.

The lens 2 preferably has a recess 6 formed in a lower central portion 7 of the lens 2. Preferably, the nosebridge 8 is releasably secured to the lens 2 at least partially within the recess 6. The nosebridge 8 preferably includes an upper groove 18 that receives a portion of the edge surface 5 at least partially within the recess 6 so that the groove 18 releasably holds the lens 2 by the edge surface 5. Preferably, the lens 2 is received in snap-fit fashion in the groove 18.

The core member 16 is preferably formed of a material that is hand bendable, that is, it can be bent to a new shape or configuration by a user by hand without the use of any tools. Preferably, the core member 16 is formed of metal such as nickel silver, steel, or Monel. Providing a core member 16 formed of a material that is hand bendable allows a user to mold nosepiece 12 to a desired configuration or one that most comfortably fits their nose. The core member 16 preferably comprises a length of wire 16.

Preferably, the first and second ends 12 and 13 of the nosepad 12 extend substantially at acute angles to the first and second ends 9 and 10, respectively, of the nosebridge 8. Preferably, the recess 6 in the lower central portion 7 of the lens 2 has the shape of an inverted U. The outer member 17 preferably comprises a polymer. In various embodiments, outer member 17 is formed of a resilient material such as an elastomer. Suitable materials for outer member 17 include rubber, thermoplastic urethane (TPU), and hydrophilic materials such as Megol. In certain embodiments, outer member 17 may be overmolded around core member 16.

The body 15 of the nosepad 12 is preferably attached to the body 11 of the nosebridge 8 by at least one mechanical fastener 19. Preferably, the mechanical fasteners 19 are screws 19. The screws 19 preferably pass through the body 15 of the nosepad 12 and into the body 11 of the nosebridge 8.

In light of the foregoing disclosure of the invention and description of various embodiments, those skilled in this area of technology will readily understand that various modifications and adaptations can be made without departing from the scope and spirit of the invention. All such modifications and adaptations are intended to be covered by the following claims.

I claim:

1. Eyewear (1) comprising:
    a. a lens (2) having a front surface (3), a rear surface (4), and a peripheral edge surface (5);
    b. a nosebridge (8), having a first end (9), a second end (10), and a substantially inverted-U-shaped body (11), releasably secured to said lens (2); and
    c. an adjustable nosepad (12), having a first end (13), a second end (14), and a substantially inverted-U-shaped body (15), releasably secured to said nosebridge (8), said nosepad (12) comprising:
        i. a core member (16); and
        ii. an outer member (17) substantially encasing said core member (16), said outer member (17) being softer than said core member (16).

2. The eyewear (1) of claim 1, wherein:
    a. said lens (2) has a recess (6) formed in a lower central portion (7) of said lens (2).

3. The eyewear (1) of claim 2, wherein:
    a. said nosebridge (8) is releasably secured to said lens (2) at least partially within said recess (6).

4. The eyewear (1) of claim 3, wherein:
    a. said nosebridge (8) includes an upper groove (18) that receives a portion of said edge surface (5) at least partially within said recess (6) so that said groove (18) releasably holds said lens (2) by said edge surface (5).

5. The eyewear (1) of claim 4, wherein:
    a. said lens (2) is received in snap-fit fashion in said groove (17).

6. The eyewear (1) of claim 2, wherein:
    a. said recess (6) in said lower central portion (7) of said lens (2) has the shape of an inverted U.

7. The eyewear (1) of claim 1, wherein:
    a. said core member (16) is hand-bendable.

8. The eyewear (1) of claim 7, wherein:
    a. said core member (16) comprises a metal.

9. The eyewear (1) of claim 8, wherein:
    a. said core member (16) comprises a length of wire (16).

10. The eyewear (1) of claim 1, wherein:
    a. said first and second ends (12 and 13) of said nosepad (12) extend substantially at acute angles to said first and second ends (9 and 10), respectively, of said nosebridge (8).

11. The eyewear (1) of claim 1, wherein:
    a. said outer member (17) comprises a polymer.

12. The eyewear (1) of claim 1, wherein:
    a. said body (15) of said nosepad (12) is attached to said body (11) of said nosebridge (8) by at least one mechanical fastener (19).

13. The eyewear (1) of claim 12, wherein:
    a. said mechanical fasteners (19) are screws (19).

14. The eyewear (1) of claim 13, wherein:
    a. said screws (19) pass through said body (15) of said nosepad (12) and into said body (11) of said nosebridge (8).

* * * * *